April 7, 1970 GENJIRO KIMURA 3,504,439
COMPASS

Filed April 11, 1969 2 Sheets-Sheet 1

April 7, 1970  GENJIRO KIMURA  3,504,439
COMPASS

Filed April 11, 1969  2 Sheets-Sheet 2

United States Patent Office 3,504,439
Patented Apr. 7, 1970

3,504,439
COMPASS
Genjiro Kimura, 40–1 3-chome, Maehara-cho,
Koganei-shi, Tokyo, Japan
Filed Apr. 11, 1969, Ser. No. 815,437
Claims priority, application Japan, Apr. 19, 1968,
43/26,252; Sept. 17, 1968, 43/80,570; Sept. 27,
1968, 43/84,004; Oct. 7, 1968, 43/87,537
Int. Cl. B43l 9/02
U.S. Cl. 33—27                                7 Claims

ABSTRACT OF THE DISCLOSURE

A compass of the type in which a first leg having a needle point at one end and a second leg which may have a needle point, a pencil lead, a drawing pen or the like at one end are pivotally connected with each other at the other ends thereof by means of a pivot pin, the compass having a reel provided concentrically with the axis of the pivot pin and a tape wound on said reel with one end thereof secured on the reel and the other end thereof being drawn out from the reel along one of said legs and fixed on the other leg after passing around a guide member provided on said one leg. The tape is provided with a scale thereon by which the span of the compass is read when the compass is opened.

BACKGROUND OF THE INVENTION

Field of the invention

The present invention relates to a drawing instrument and more particularly to a compass which is provided with means for reading the span of the legs thereof. The term "compass" as used herein includes dividers.

Description of the prior art

In using a conventional drawing compass, for example, for drawing a circle, it has been necessary first to adjust the span of the pair of legs to the radius of the desired circle on a scale. The operation of measuring, for example, a linear distance using a conventional divider has also involved the step of setting the span of the pair of legs thereof at the linear distance to be measured and then measuring the span of the legs on a scale, and thus has been quite cumbersome.

SUMMARY OF THE INVENTION

An object of the present invention is to provide a compass which is provided with means for indicating the span of the pair of legs thereof and which is convenient in handling.

According to the present invention, there is provided a compass having a pair of legs pivotally connected with each other at one of the ends thereof, in which a reel with a tape wound thereon is concentrically rotatably mounted around a pivot pin by which said legs are connected and one end of the tape is extended along one of said legs and, after passing around a guide member on said leg, led to the other leg to be secured thereto. The positional relation between the guide member on one of the legs and the point on the other leg where the tape end is secured, is preferably such that when the pair of legs are opened, the length of the tape between the legs extends perpendicularly to the bisector of the angle defined by the legs. The tape is provided with a scale thereon to indicate the span of the legs. Therefore, the span of the legs can be known by reading the scale mark in alignment with an index line provided on said one leg. The reel is mounted on the pivot pin through the intermediary of means by which said reel is biased to rotate in a direction to take-up the tape. Thus, when the legs are closed from the open state, the tape is automatically taken up on the reel without being permitted to be slackened.

The guide member on one of the legs is preferably cylindrical in shape and a roller may be fixed on the leg as the guide member. Alternatively, a columnar rod may be fixed on the leg to constitute the guide member. For securing the tape end on the other leg, it is preferable to provide a columnar member of the same outer diameter as the guide member on said other leg at a location corresponding to said guide member and to secure the tape end on said columnar member by means of an adhesive. In this case, the guide member and the columnar member are so dimensioned that they contact each other at their peripheral surfaces when the legs are closed with the points thereof in contact with each other. Alternatively, the tape end may be secured to the inner surface of the other leg by other mechanical means. The radius of the guide member and the tape holding member is selected to be about 30–40 times the thickness of the tape so as to prevent the formation of a folding line on the tape. It is also important that when the guide member and the tape holding member are brought into contact with each other upon closing the compass, the points of both legs are simultaneously brought into contact with each other but not with pressure, so as to prevent the point of a pencil lead or other drawing tool from being damaged by the needle point of the opposite leg.

At least that one of the legs in which the tape is passed is preferably shaped with a hollow or channel-like cross-section for accommodation of the tape and a sight opening is preferably formed in said leg so that the scale on the tape may be visible therethrough. Since the scale on the tape is small, it is convenient from the standpoint of improved reading accuracy to provide a lens in the sight opening for reading the scale on the tape therethrough.

DESCRIPTION OF THE PREFERRED EMBODIMENT

Figure 1:
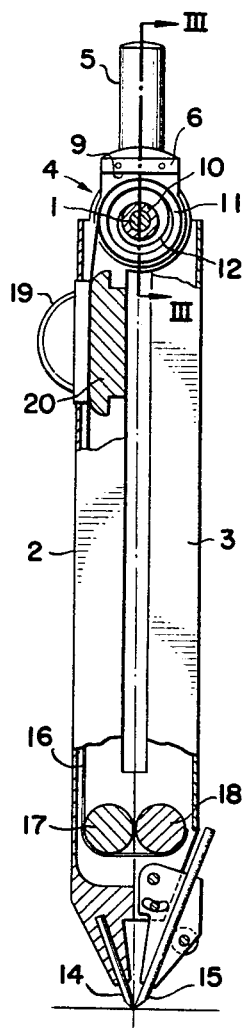
FIGURE 1 is an elevational view, partially in section, showing a compass according to the present invention in a closed state.
Figure 2:
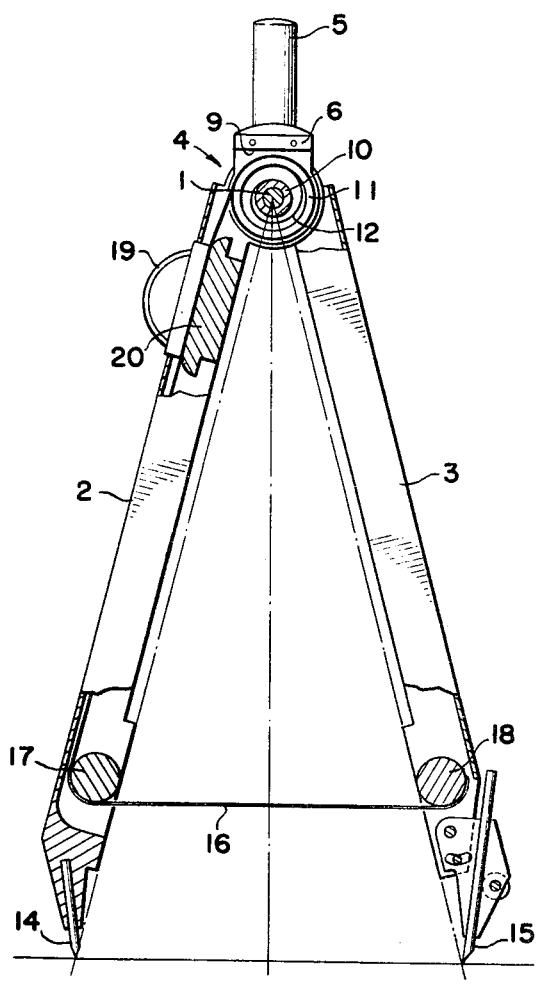
FIGURE 2 is an elevational view, partially in section, showing the compass in an opened state.
Figure 3:
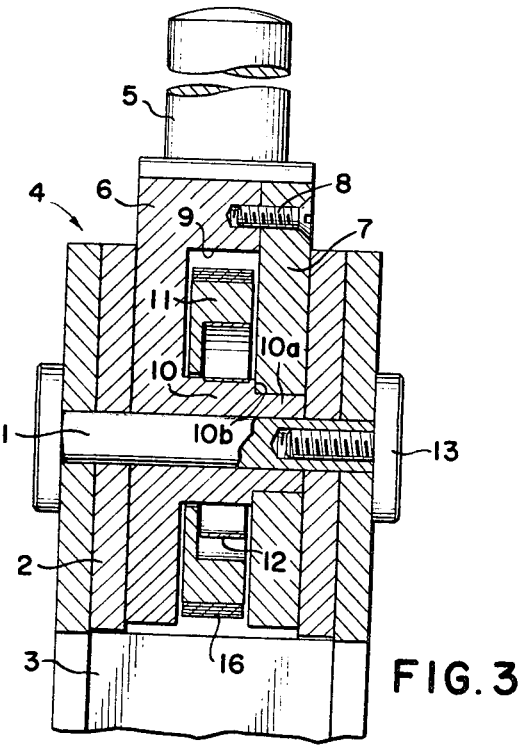
FIGURE 3 is an enlarged cross-sectional view taken on the line III—III of FIGURE 1.

Referring to the drawings, particularly to FIGS. 1 to 3, the compass shown comprises a pair of legs 2 and 3 which are pivotally connected with each other at one of the ends thereof by a pivot pin 1, with a head grip assembly 4 intervening therebetween. The head grip assembly 4 comprises a head body having a grip 5 and a casing 6, and a cover 7 fixedly secured to said casing 6 by a pair of screws 8. The casing 6 has a recess 9 formed substantially centrally thereof and is formed with a boss 10 extending within the recess 9 and having an axial hole for the passage of the pivot pin 1 therethrough. The cover 7 is formed with a hole for receiving a reduced diameter end 10a of the boss 10 and set in position by a shoulder 10b of said boss. When the cover 7 is fitted to the casing 6, an annular cavity is formed around the boss 10. According to the present invention, a reel 11 is disposed in the annular cavity. The reel 11 consists of a hollow annular member which is loosely mounted on the boss 10 and connected therewith by a spiral spring urging said reel 11 to rotate clockwise as viewed in FIG. 1. The head grip assembly 4 constructed as described above is pivotably combined with the upper ends of the compass legs 2 and 3 by a tightening screw 13, threaded into one end of the pivot pin 1, as shown in FIG. 3. With such construction, when the compass is opened, the spiral spring is wound up and, due to the inherent characteristic of the spiral spring, a force is developed to close the compass. Therefore, if such a closing force is excessively strong or the tightening force of the connecting pivot pin is too weak, an error would occur in the radius of a circle drawn by the compass, despite a deliberate effort made prior to drawing the circle in setting a tape scale on an index line. Such disadvantage may be eliminated, for example, by interposing between the connecting ends of the legs 2 and 3 a packing of urethane rubber or the like material which has a large coefficient of friction, is resistive to wear and whether and also is resilient to some extent. In the embodiment shown, the legs 2 and 3 have a channel-shaped cross-section and are combined with the open sides thereof confronting each other. The leg 2 is provided with a needle point 14 at the lower end, while the leg 3 is provided with a pencil lead 15 at the lower end thereof. The pencil lead 15 is carried by a pencil attachment of the known structure so that the position and the direction of the pencil lead can be adjusted. According to the present invention, the reel 11 disposed within the casing 6 of the head grip assembly has a tape 16 wound thereon. The tape 16 is preferably made of polyester and one end thereof is secured to the peripheral surface of the reel 11, while the other end thereof is drawn out of the casing 6 and extends along the inner face of the leg 2. A guide member 17 is provided on the leg 2 at a location adjacent the needle point 14, whereas a tape holding member 18 is provided on the leg 3 at a location corresponding to said guide member 17. The guide member is preferably a roller having a circular cross section and rotatably mounted on the leg 2, but it may be fixedly mounted on said leg with no practical disadvantage. In case of the latter, it is essential that the guide member has an arcuate or curved surface of a predetermined radius of curvature at a portion which is in sliding engagement with the tape, and the remaining portion of the guide member may be of any shape. Similarly, the tape holding member 18 must be arcuate or curved at the same radius of curvature at a portion in contact with the tape, in symmetrical relation to the guide member 17, and the remaining portion may be of any shape. Preferably, however, the tape holding member 18 is of the same dimensions and the same cross-sectional shape as the guide member 17, and is unrotatably fixed to the leg 3. The tape 16 extending from the reel 11 is passed around the guide member 17 and then is led to the leg 3 to be secured to the peripheral surface of the tape holding member 18. Alternatively, the end of the tape 16 may be secured to the inner surface of the leg 3. The dimensions and positions of the members 17 and 18 are so selected that when the legs 2 and 3 are opened as shown in FIG. 2, the tape 16 extends at right angles to the bisector L of the angle defined by said legs. Namely, where the members 17 and 18 are of the same shape and same dimension as in the embodiment shown, said members are located at the same distance from the axis of the pivot pin. Further, it is preferable that when the compass is closed as shown in FIG. 1, the peripheral surfaces of the members 17 and 18 are held in contact with each other and the end points of the members 17 and 18 respectively lie on the aforesaid bisector L in contact with each other.

The leg 2 is formed with a sight opening so that the tape running along the inner surface of the leg may be visible from the outside therethrough, and a lens 19 is fitted in said sight opening. The lens 19 is provided for the purpose of facilitating accurate reading of a scale on the tape 16 to be described later, but a transparent glass or plastic sheet may alternatively be used for simplicity. In either case, it is convenient to provide an index line on the lens or transparent sheet. The leg 2 is also provided with a tape supporting block 20 which defines between it and the inner face of the lens 19 a passage just wide enough for the passage of the tape 16 therethrough. The tape 16 is taken up on the reel 11 when the legs of the compass are closed to the state shown in FIG. 1 and is drawn out from the reel, when the legs are opened as shown in FIG. 2, in a length corresponding to the degree of opening of the legs. Therefore, by arranging the scale mark of O on the tape 16 in alignment with the index line on the lens or the transparent sheet when the compass is closed with the end points of its legs in contact with each other, the length of the tape drawn out from the reel upon opening the compass, that is, the span of the compass, can directly be known by reading the scale mark on the tape which is in alignment with the index line on the lens or the transparent sheet fitted in the sight o pening of the leg 2.

Next, the manner of establishing the scale will be explained with reference to FIG. 4.

Figure 4:
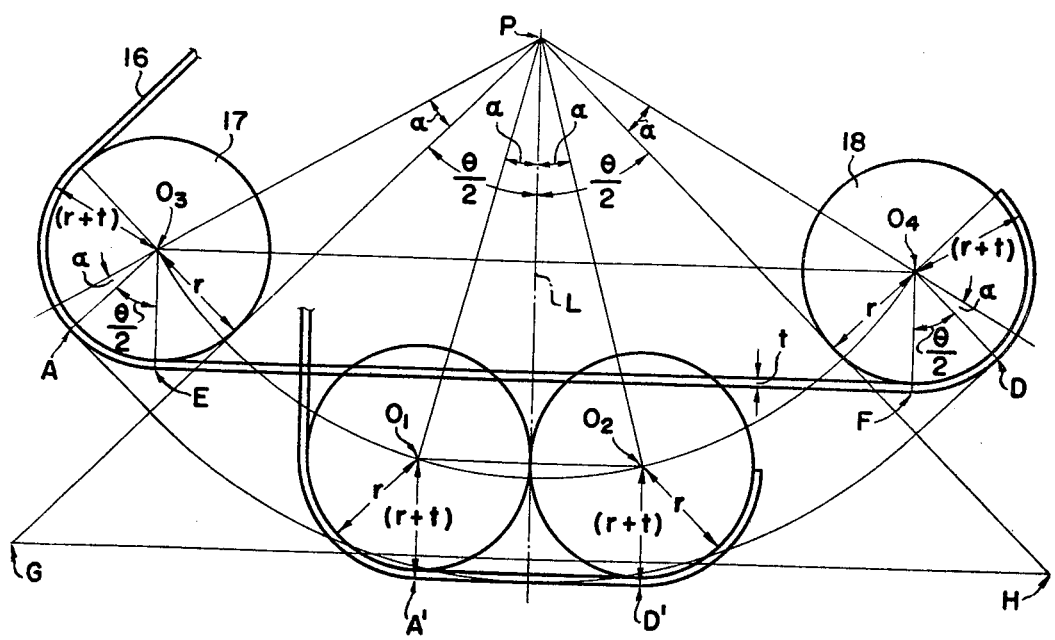
FIGURE 4 is a diagrammatical view illustrating the principle upon which a tape is scaled.

Referring to FIG. 4, reference symbol P designates the pivot point, G the needle point of leg 2, H the point of the pencil lead carried by the leg 3, $O_1$ and $O_2$ the centers of the members 17 and 18 respectively when the legs 2 and 3 are closed, and $O_3$ and $O_4$ the centers of the members 17 and 18 respectively when the legs 17 and 18 are opened at an angle of $\theta$. The length of the tape between points A' and B' in the closed state of the legs 2 and 3 is changed to $$\widehat{AE} + \overline{EF} + \widehat{FD}$$

when the legs 2 and 3 are opened at an angle of $\theta$. This length N is represented by the following equation:

$$N = \widehat{AE} + \overline{EF} + \widehat{FD} = 2 \times \left\{ \frac{\theta}{2}(r+t) + \sqrt{r^2 + l^2} \cdot \sin\left(\alpha + \frac{\theta}{2}\right) \right\}$$

wherein $\theta$=the angle defined by the legs, $l$=the distance between the point P and the contact point between the members 17 and 18, $$\alpha = \tan^{-1} \frac{r}{l}$$

$r$=the radius of the members 17 and 18, and $t$=the thickness of the tape.

Therefore, when the legs are opened at an angle of $\theta$ from the closed state in which the scale mark for O is aligned with the index line, the length $y$ of the tape drawn out past the index line is represented by the following equation:

$$y = 2 \times \left\{ \frac{\theta}{2}(r+t) + \sqrt{r^2 + l^2} \cdot \sin\left(\alpha + \frac{\theta}{2}\right) \right\} - 2r \quad (1)$$

On the other hand, with R representing the span of the compass, $\overline{GH} = R$ = the span of the compass and
$\overline{PG} = \overline{PH} = Q$ = constant in FIG. 4. Therefore, $$\frac{R}{2} = Q \sin \frac{\theta}{2}$$

$$\theta = 2 \sin^{-1} \frac{R}{2Q} \quad (2)$$

Accordingly, in the embodiment shown, if the value of R, i.e. the span of the compass, is established, the value of $\theta$ is obtained from the Equation 2 as the $\overline{PG}$ is constant, and by incorporating the value of $\theta$ thus obtained in the Equation 1 the value of $y$ is determined as $r$, $t$, $l$ and $\alpha$ are constant respectively. It will, therefore, be understood that by providing a scale on the tape, indicating the value of $y$ corresponding to the value of R, in such a manner that the scale mark for O is set in alignment with the index line on the lens or transparent sheet, the span of the compass can readily be obtained from the scale mark then in alignment with the index line. The scale mark for O may be set in alignment with the index line, in the closed state of the legs 2 and 3, by adjusting the connecting point of the tape on the reel or by rendering the lens 19 proper adjustable in position.

The tape 16 used in the present invention is preferably made of such material which is less susceptible to the effects of moisture and temperature changes and has a large Young's modulus, and a tape, for example, of polyester is suitably used. The Young's modulus of polyester tape is of the order of 400 kg./mm.$^2$ and is subjected to elongation under tension. In the present invention it is essential to reduce the error resulting from tape elongation, to a degree not objectionable; to practical use, for the purpose of improving the accuracy of the compass. This can be attained by designing the spiral spring, included in the head grip assembly, in the following manner: Namely, where the tolerable elongation of the entire scale length on the polyester tape is 0.1 mm., the allowable tension for the tape is determined from the Young's modulus and the cross-sectional area of the tape. Then, the bending moment acting on the spiral spring is determined from the outer diameter of the annular cavity in which the spiral spring is disposed. Further, from the maximum span of the compass, the number of turns of the tape wound in the annular cavity is determined. The spiral spring should be designed such that, in view of the bending moment and the number of turns of the tape, the bending moment acting on the spring at the start of opening and at the end of opening the compass, that is, the torque characteristic with respect to the number of turns of the spring, becomes flat to the maximum possible extent and accordingly the spring constant of the spiral spring becomes slightly smaller than usual, so that the tape is always subjected to substantially uniform tension irrespective of the opening angle of the compass. Such a design is essential for maintaining the scale accuracy of this type of compass.

In order to prevent the reel from being displaced eccentrically, the reel may preferably be provided at one side thereof with a circular wall plate, as shown in the drawings, which wall plate has a central hole for rotatably receiving the boss of the casing.

Although the present invention has been described and illustrated hereinabove with particular reference to a compass having a needle point on one leg and a pencil lead on the other leg, it will be obvious that the present invention is also applicable to dividers having a needle point on both legs and to drawing compasses having a drawing pen, or the like on one leg.

What is claimed is:

1. A compass comprising a pair of legs, means for pivotally connecting said legs at one of the ends thereof, a reel rotatably mounted around the pivot connection of said legs and a tape wound on said reel with one end secured thereto, the other end of said tape being drawn out from said reel along the length of one of said legs, a substantially cylindrical guide member fixed on said one leg, a tape holding member of the same shape and the same dimensions as said guide member fixed on said other leg at a location corresponding to that of said guide member, the tape passing around the guide member to the other leg to be secured to the tape holding member thereon, said tape being provided with a scale thereon for indicating the linear distance between the free ends of said legs when said legs are opened, said one leg being provided with a corresponding index line for reading the scale on the tape.

2. A compass as defined in claim 1, in which said guide member and said tape holding member are so arranged that they contact each other at their peripheral surfaces when the compass is closed.

3. A compass as defined in claim 1, in which said guide member is a roller and is rotatably mounted on said one leg.

4. A compass as defined in claim 1, in which said pair of legs are members having a channel-shaped cross-section and are arranged with the open sides confronting each other, said tape being led along the inner surface of said one leg, said one leg having a sight opening for viewing said tape therethrough.

5. A compass as defined in claim 4, comprising a tape supporting block on the inner side of said one leg for positively guiding said tape along the inner surface of said one leg.

6. A compass as defined in claim 4, comprising a lens fitted in said sight opening for reading the scale on the tape in a magnified state, said index line being formed on the backside of said lens.

7. A compass as defined in claim 1, in which the position of said guide member and the position where the other end of said tape is secured are so determined that when the legs are opened, the length of the tape extending across said legs is perpendicular to the bisector of the angle defined by said legs.

References Cited

UNITED STATES PATENTS

| | | | |
|---|---|---|---|
| 743,490 | 11/1903 | Griffith. | |
| 1,411,929 | 4/1922 | Miller | 33—138 |
| 2,335,105 | 11/1943 | Browning | 33—138 |

FOREIGN PATENTS 519,799  3/1955  Italy.

HARRY N. HAROIAN, Primary Examiner

U.S. Cl. X.R.

33—138